April 18, 1950 S. BENZER 2,504,628

ELECTRICAL DEVICE WITH GERMANIUM ALLOYS

Filed March 23, 1946 2 Sheets-Sheet 1

INVENTOR.
Seymour Benzer,
BY
Brown Jackson Boettcher Dienner
Attys.

April 18, 1950 S. BENZER 2,504,628

ELECTRICAL DEVICE WITH GERMANIUM ALLOYS

Filed March 23, 1946 2 Sheets-Sheet 2

VARIATION WITH TEMPERATURE
IN THE VICINITY OF ROOM TEMPERATURE
(SAMPLE 25T – IN DARKNESS.)

INVENTOR.
Seymour Benzer,
BY
Brown, Jackson, Boettcher & Dienner
Attys.

Patented Apr. 18, 1950 2,504,628

UNITED STATES PATENT OFFICE 2,504,628

ELECTRICAL DEVICE WITH GERMANIUM ALLOYS

Seymour Benzer, West Lafayette, Ind., assignor to Purdue Research Foundation, La Fayette, Ind., a corporation of Indiana Application March 23, 1946, Serial No. 656,747

10 Claims. (Cl. 201—76)

My present invention relates to improvements in electrical devices, and more particularly to electrical devices which are sensitive to externally applied energy.

The electrical devices of my invention are constructed in the manner of a point contact rectifier, and comprise a semi-conductor consisting of germanium containing an impurity or impurities, and a whisker or electrode which has contact with certain regions or areas on the surface of the semi-conductors selected to provide current-voltage characteristics which are variable by applied radiant energy in a manner to be hereinafter described.

The germanium semi-conductors suitable in making devices in accordance with my invention, as above indicated contain an impurity or impurities and are therefore in a sense alloys of germanium. The word "alloy" is generally understood to mean a combination of two or more metals, but it will be understood that for purposes of my present invention the words "alloys of germanium" are intended to include an impurity or impurities, whether such are metals, non-metals, or gases, and the combination of which with germanium exhibit electrical properties such as are found in semi-conductors.

In the copending application of Karl Lark-Horovitz and Randall M. Whaley, Serial No. 604,744, filed July 13, 1945, there is disclosed various alloys of which germanium comprises the principal constituent. From these alloys rectifiers may be made which present high resistance to current flow in one direction therethrough and a lower resistance to current flow in the other direction. In that application, the semi-conductors disclosed are all of the type upon the surfaces of which points may be found which exhibit N-type rectifying characteristics i. e., they present high resistance to current flow when the semi-conductor is positive and the contacting metal electrode or whisker is negative, and a lower resistance when the potential is reversed.

While in the semi-conductors of the above application N-type rectification points are predominate, on occasion P-type areas or regions of rectification, i. e., areas or regions which when contacted by an electrode exhibit higher resistance to current flow when the semi-conductor is negative and the contacting electrode or whisker is positive, may be found. My present invention proceeds upon the discovery that in certain of the alloys of germanium of the above application and other alloys of germanium having N-type and P-type regions present in what is believed to be particular structural or physical relation with respect to each other in a manner to be described, exhibit when utilized as a semi-conductor and with an electrode or whisker in contact with certain selected areas or regions on the surface of the semi-conductor reversibly changeable resistance to current flow in the low resistance direction of current flow through the device which prevails when the semi-conductor is negative and the contacting electrode positive. The alloys of germanium of the above referred to application and other suitable alloys of germanium which may be found on occasion to exhibit the characteristics with which I am concerned will be referred to in detail hereafter. Alloys of germanium which have utility for purposes of my invention are characterized by fairly high resistivity to current flow which characteristic indicates that the germanium is substantially pure. The resistance test is a known expedient of determining the presence of impurities in germanium, and quite frequently among such crystals of germanium which present high resistance to current flow, suitable crystals may be found for constructing devices in accordance with my invention. Germanium does not occur in nature in its pure form and materials containing germanium must be refined or reduced to provide it. In reducing materials containing germanium, certain crystals thereby derived may be found of a character suitable for use as a semi-conductor element of the devices of my invention. However, I have found, for example, that on occasion in reducing dioxide that the reduction process is not always successful in producing the pure metal, but frequently germanium of high resistivity having minute impurity or impurities remaining therein are produced, providing N-type and P-type regions therein of a character suitable for use in constructing my electrical devices.

Upon the assembly of a semi-conductor consisting of a body of a suitable alloy of germanium with a whisker or electrode in contact with a point on a selected area or region on the surface of the semi-conductor, and with the device connected in circuit with a source of applied potential with the whisker positive and the semi-conductor, negative, the following characteristics in the low resistance direction of current flow through the device when subjected to light or heat of a predetermined amount may be observed. As the amount of light or heat or combination of light and heat is increased the resistance in the low resistance direction decreases and the current flow in the low resistance direction increases. One device constructed in accordance with my invention at a temperature of about 25° C. and in the dark, exhibited in the low resistance direction of current flow i. e., when the semi-conductor was negative and the contacting whisker or electrode positive the following current-voltage characteristic. At a low voltage of the order of a fraction of one volt applied on a typical selected point of contact current of an order slightly more than 0.2 milliampere will pass through the device, and upon increase of the applied voltage to about five volts the current flow will only increase slightly approaching about 0.3 milliampere. For this illustrative selected contact it will be observed that the device approaches its saturation current at low voltages without any substantial change in current flow at higher voltages. I have found that in germanium alloys exhibiting such a characteristic in the low resistance direction of current flow therethrough that the saturation current may be increased by externally applied energy either in the form of light or heat. This saturation current is caused to be increased in proportion to the intensity of illumination or depending upon the amount of applied heat. Thus the electrical device of my invention may be utilized as a photosensitive device or as a thermosensitive device, or if desired the device may be caused to be actuated by combinations of applied light and heat.

The devices of my invention further are adapted for use in generating an electric current in an external circuit without the need for an external supply voltage when subjected to illumination. The devices when used in this manner should be preferably of low internal resistance and this may be accomplished by making the contact between the whisker or electrode with a point on a selected area or region on the semi-conductor of large area, as for example, of an area of $10^{-4}$ $cm.^2$ or greater.

As previously related it is thought that a particular structural or physical arrangement of the N-type and P-type regions in alloys of germanium account for the above noted electrical characteristics. So far as I am now aware it is believed that an area of N-type rectification is enclosed within an area or region of P-type rectification with there being a barrier between the N-type and P-type regions in the body of the alloy. The device is constructed so that the electrode or whisker has contact with the surface of the semi-conductor in the N-type region within the perimeter of the barrier between it and the P-type region. The presence of this barrier causes the previously noted saturation effect in that only a limited number of electrons have sufficient energy to escape beyond the barrier. However, as the light or heat is increased more electrons are activated and the saturation value of the current increases. Now when the device is incorporated in a circuit having no external potential source light reaching the barrier causes a voltage to appear across the barrier which produces current flow in the circuit.

It is an object of my invention to provide an electrical device comprising a semi-conductor and an electrode or whisker having contact with the surface of the semi-conductor in which the latter consists of a body of an alloy of germanium having N-type and P-type regions or areas in a predetermined relation therein with respect to which the electrode or whisker has contact on the surface of the semi-conductor whereby the flow of electrons is sensitive to applied radiant energy.

A further object of my invention is to provide an electrical device adapted to generate an electric current when subjected to light.

A further object of my invention is to provide an electrical device the electrical resistance of which is variable with changes in externally applied energy.

A further object of my invention is to provide an electrical device comprising a semi-conductor consisting of germanium, indicating by its conductivity the presence of an impurity or impurities therein, with the surface of which semi-conductor an electrode or whisker is adapted to have contact in areas or regions thereon exhibiting the characteristic of saturation in the current flow within a given range of applied external voltages, and which saturation currents are sensitive to externally applied energy.

A further object of my invention is to provide an electrical device comprising a semi-conductor consisting of germanium, indicating by its conductivity the presence of an impurity or impurities therein, with the surface of which semi-conductor an electrode or whisker is adapted to have contact in areas or regions thereon exhibiting the characteristic of saturation in the current flow within a given range of applied external voltages, and which saturation currents are sensitive to externally applied light.

A further object of my invention is to provide an electrical device comprising a semi-conductor consisting of germanium, indicating by its conductivity the presence of an impurity or impurities therein, with the surface of which semiconductor an electrode or whisker is adapted to have contact in areas or regions thereon exhibiting the characteristic of saturation in the current flow within a given range of applied external voltages, and which saturation currents are sensitive to externally applied heat.

A further object of my invention is to provide an electrical device comprising a semi-conductor consisting of germanium, indicating by its conductivity the presence of an impurity or impurities therein, with the surface of which semiconductor an electrode or whisker is adapted to have contact in areas or regions thereon exhibiting the characteristic of saturation in the current flow within a given range of applied external voltages, and which saturation currents are sensitive to externally applied light and heat.

A still further object of my invention is to provide an electrical device comprising a semi-conductor of germanium, indicating by its conductivity the presence of an impurity or impurities therein, with the surface of which semi-conductor an electrode or whisker is adapted to have contact in areas or regions exhibiting when the semi-conductor is negative and the whisker is positive the characteristic of saturation in the current flow within a given range of voltages, and which current responds to externally applied energy, increasing in a given range of voltages whether the radiant energy be in the form of light or heat or combination of both light and heat, and decreasing when heat is removed by cooling.

A still further object of my invention is to provide an electrical device comprising a semi-conductor consisting of germanium indicating by its conductivity the presence of an impurity or impurities therein with the surface of which semiconductor an electrode or whisker is adapted to have contact in areas or regions thereon which, when light is projected thereon, causes an electric current to be generated.

A still further object of my invention is to provide an electrical device comprising a semi-conductor consisting of germanium indicating by its conductivity the presence of an impurity or impurities therein with the surface of which semi-conductor an electrode or whisker is adapted to have contact in areas or regions thereon such that when light is projected on these areas or regions a voltage is effected across the contact whereby an electric current is generated and flows through the device.

The above and other objects and advantages of my invention will appear from the detail description.

Now in order to acquaint those skilled in the art with the manner of constructing and utilizing electrical devices in accordance with my invention, I shall describe in connection with the accompanying drawings certain preferred embodiments of my invention.

Figures 1, 2, 3:
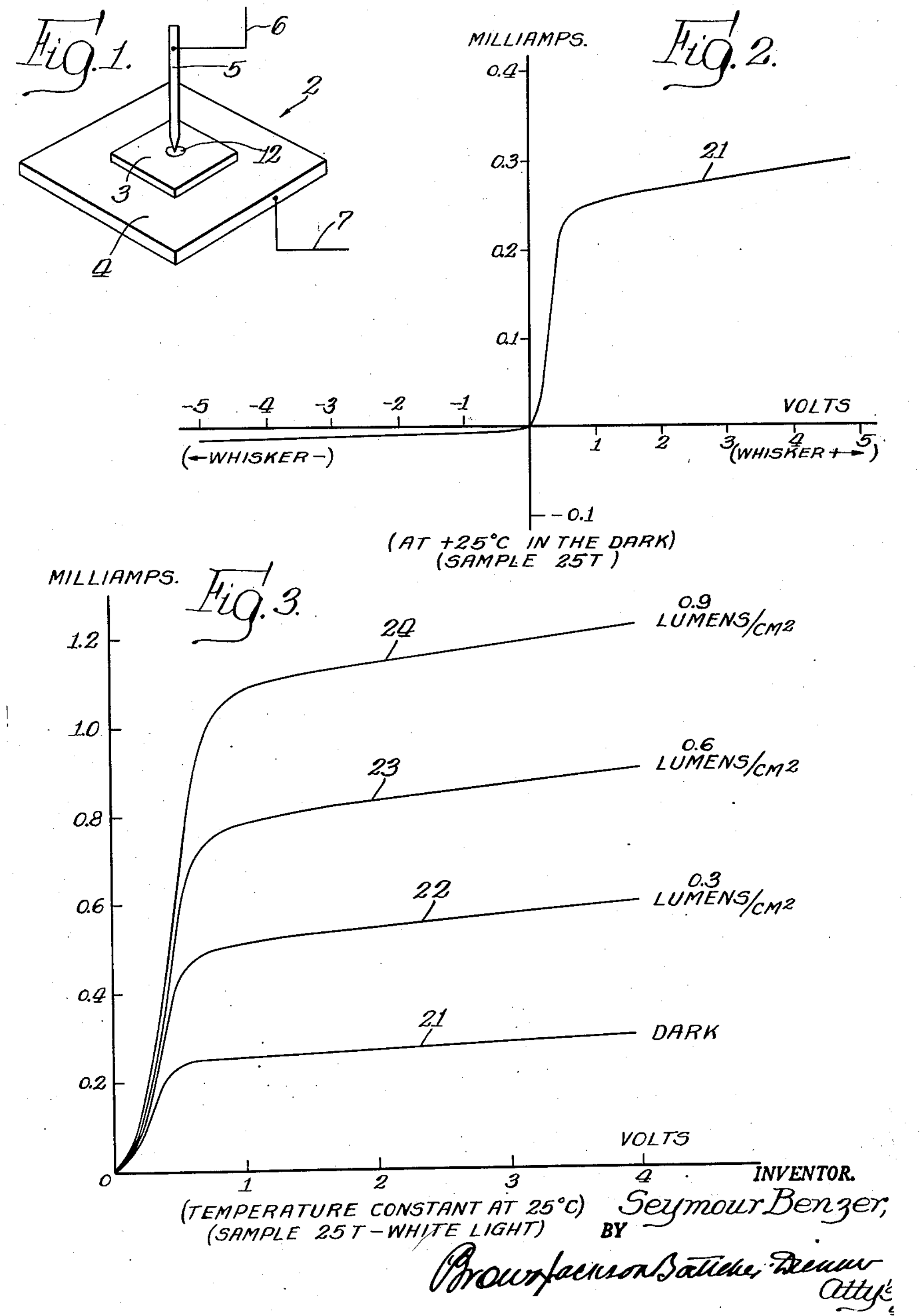
Figure 1 is a diagrammatic view of an electrical device sensitive to externally applied energy constructed in accordance with my present invention.
Figure 2 is a graph illustrating the current voltage characteristics of the device of Figure 1.
Figure 3 is a graph illustrating the effect of illumination upon the current-voltage characteristics of the device of Figure 1 in the low resistance direction of current flow therethrough i. e., when the semi-conductor is negative and the contacting whisker or electrode is positive.
Figures 6, 7:
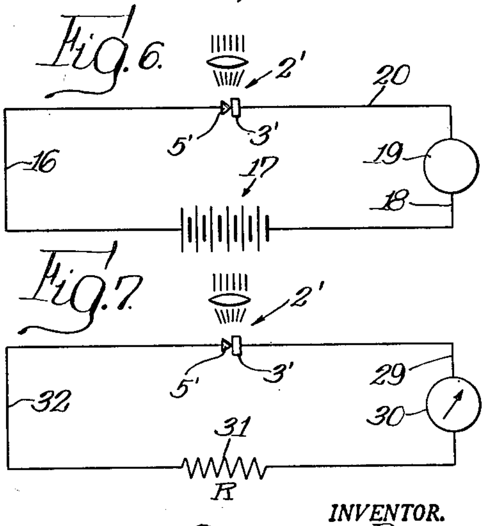
Figure 6 is a typical simple circuit diagram in which the device of Figure 1 may be embodied.
Figure 8:
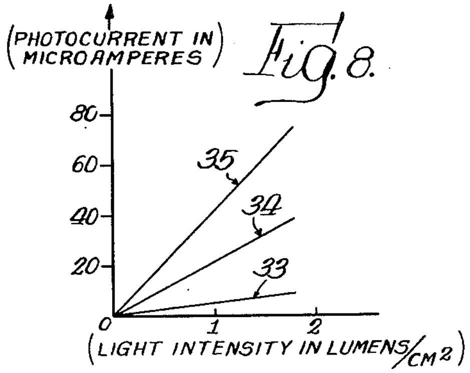

Figure 7 is a typical simple circuit diagram in which the device of Figure 1 may be embodied to provide for the flow of an electric current in the circuit upon application of light to a selected point of contact; and Figure 8 is a graph illustrating the current generating characteristic of the device of Figure 1 for a selected contact of the electrode or whisker with the surface of the semi-conductor in an area or region thereof sensitive to light.

Referring now to the drawings, I have shown in Figure 1 an electrical device 2 constructed in accordance with my invention which comprises a semi-conductor 3 made of an alloy of germanium referred to in greater detail hereinafter. The semi-conductor 3 is preferably soldered or otherwise secured to a conductor plate 4 of any metal or alloy having good electrical conductivity characteristics. An electrode or whisker 5 is formed with a pointed end which makes point contact with the surface of the semi-conductor 3. The electrode or whisker 5 is made of a metal or alloy of good electrical conductivity, and preferably of good mechanical strength. Several metals that have been found satisfactory for use in making the electrode or whisker are tungsten, platinum, copper, iron, gold, silver, manganese, tantalum, nickel, zinc, molybdenum, zirconium, lead, and platinum-iridium alloys. A lead 6 is suitably connected to the electrode 5 and a lead 7 has connection with the conductor plate 4 upon which the semi-conductor is mounted.

The semi-conductor 3 consists of a crystal or body of substantially pure germanium but having a small amount of an impurity or impurities therein. As above related several of the alloys of germanium disclosed in the copending application of Karl Lark-Horovitz and Randall M. Whaley, Serial No. 604,744, filed July 13, 1945, have been found to have an arrangement of N-type and P-type regions or areas of a character suitable for use in constructing the devices of my invention. Among these are alloys prepared by adding to pure germanium one of the following impurities in the amount of the order of 0.2 atomic percent: tin, strontium, barium, bismuth, lead, titanium.

In addition, alloys prepared by solidifying molten pure germanium in an atmosphere of nitrogen, at pressures from 2 millimeters of mercury to atmospheric pressure, have been found to contain regions which show the properties herein referred to.

In addition, substantially pure germanium, prepared without the addition of impurities, but indicating by its electrical conductivity the presence of some ionized impurity, is often found to exhibit the behavior herein described.

It is believed that the photosensitive and temperature sensitive characteristics hereinafter referred to in greater detail are not due specifically to the particular impurity present, but is due to inhomogeneity of the alloy, i. e. the presence of both P and N type material in the same sample, giving rise to the barriers hereinafter referred to. Such inhomogeneities arise most easily in germanium alloys of relatively high resistivity, since small amounts of impurity have a large effect on the resistivity of such pure samples.

Another method of producing suitable germanium crystals for the purposes of my invention may be accomplished by reducing germanium dioxide by the known carbon reduction process to produce carbon dioxide and what would generally be considered to be pure germanium.

One example of such a reduction was to place a mixture of 40 grams of germanium dioxide and 6.8 grams of sugar carbon in a porcelain crucible, fitted with a lid and heated to about 1000° C. in an electrically heated furnace in air for five and one-half hours. The resulting germanium was then remelted and solidified in vacuum.

It will also be understood that by examining and testing high resistivity germanium crystals at random usually some crystals may be found which exhibit the characteristics with which I am herein concerned and which may be used in constructing the device of Figure 1.

It will be understood however that not all germanium crystals containing impurities are suitable for practicing my invention, but by testing high resistivity germanium crystals, suitable crystals may usually be found by the expedient of probing the surface thereof with a whisker or electrode with suitable source of potential being maintained between the crystal and electrode. As a further observation it should be noted that the quantity of impurity or impurities in the germanium is exceedingly small since the effects are most often found in germanium which for most practical purposes would be assumed to be pure particularly when such germanium is prepared by reduction processes intended to produce the pure metal.

In the high resistivity germanium crystals suitable for use in my invention, I have found that such germanium crystals comprise N-type regions, that is, regions which exhibit relatively low resistance to current flow when the whisker or electrode is positive and the semi-conductor is negative as compared with the resistance to current flow when the potential upon the semi-conductor and electrode or whisker is reversed. Also, in these germanium crystals points of contact may be found which exhibit P-type rectification which is opposite to that of the above referred to N-type rectification. So far as I have at present been able to determine the semi-conductor 3, as shown in Figure 6, comprises a barrier 11 which completely segregates an N-type region or area 12 from a P-type area or region 13. The back soldered contact is indicated by 15.

It is believed that the characteristics hereinafter described are due to the presence of the barrier 11 between the N-type and P-type regions 12 and 13, respectively, of the semi-conductor. However, it will be understood that the characteristics may be due to the change in the structure of the germanium due to the presence of an impurity or impurities therein. Also, it will be further understood that while I shall describe my invention in connection with the theory of the presence of the barrier 11 which completely segregates an N-type area 12 at the surface of the conductor from a surrounding P-type region in the semi-conductor it will be understood that the characteristics may be due to other causes. However by following the above sources a number of germanium crystals may be readily found which when constructed in the device of Figure 1 and embodied in circuits to be hereinafter described, the results described herein may be achieved.

Figure 5:
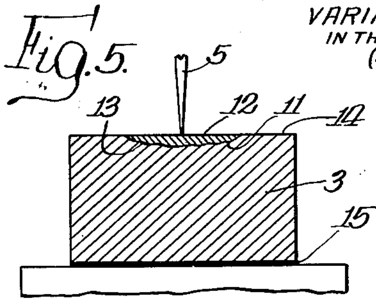
Figure 5 is a diagrammatic illustration of what is believed to be the physical structure of the semi-conductor of Figure 1 showing the whisker or electrode having contact in an area or region on the surface of the semi-conductor accounting for the sensitivity of the device to externally applied energy.

I shall now describe the device of Figure 1 in which the electrode 5 has point contact with an N-type region, on the surface of the semi-conductor within the perimeter thereof, such as region 12 of Figure 5, when the device is embodied in the circuit shown in Figure 6. In the circuit of Figure 6 the electrode or whisker 5' has connection by means of a lead 16 with the positive side of a source of potential 17, and with a lead 18 extending from the negative terminal of the source of potential 17 to a current responsive device 19 and from which a lead 20 extends to the semi-conductor 3'. Referring now to Figure 2 the right hand half of the graph therein shown illustrates the current-voltage characteristic curve at direct current potentials of 0 to 5 volts applied to the device with the device in the dark and the temperature maintained at about 25° C. If an alternating current source is substituted for the direct current supply source 17, the curve of current flow in the other or high resistance direction, i. e., with the semi-conductor positive and the whisker negative is that as shown in the left hand half of the graph. However, the characteristic with which I am primarily concerned in my present invention is that which prevails when the whisker or electrode is positive and the semi-conductor negative as illustrated by the right hand half 21 of the curve illustrated in Figure 2. The device of Figure 1 in the low resistance direction of current flow therethrough approaches a saturation effect at less than one volt, there being a small change in the resistance and current flow at the voltages up to the order of five volts.

The current-voltage curve in the direction of higher resistance as shown in Figure 2, is due to rectification at the immediate contact of the whisker with the N-type germanium region and is not due to the internal barrier which is responsible for the saturation effect. Thus, by pressing the whisker against the germanium with increased force, the high resistance may be greatly reduced, while the saturation effect is unchanged.

Now referring to Figure 3 it will be observed that if light of 0.3 lumen/cm.$^2$ is projected on the neighborhood of the point of contact between the whisker 5' and a semi-conductor 3' having the characteristics of curve 21 of Figures 2 and 3 and with the temperature maintained substantially constant at 25° C. that the saturation current increases to about 0.5 milliampere, as shown by the curve 22 of Figure 3.

Now upon increasing the light projected on the neighborhood of the selected point of contact between the electrode 5' and a semi-conductor 3' to about 0.6 lumen/cm.$^2$ the current-voltage characteristic will be that of the curve 23 of Figure 3 in which it will be observed that a saturation current in the vicinity of about 0.8 milliampere prevails. Upon increasing of the light to 0.9 lumen/cm.$^2$ the current-voltage characteristic will be that shown by the curve 24. It will be understood that in connection with curves 23 and 24 that the light is the only variable, and that the temperature of the device is maintained substantially constant at 25° C. It will thus be observed that when the neighborhood of the point of contact between the electrode 5' and the semi-conductor 3' is illuminated with the temperature held constant that the saturation current increases, and that the change of saturation current is proportional to the intensity of illumination.

The device 2 is particularly sensitive to white light, as high, for example, as several milliamperes per lumen, which is a considerably high value compared to other photocells of this type of the prior art.

Also the photosensitive device of my invention is most sensitive to light of a wave length of about 1.3 microns, whereas most of the photocells of the prior art cannot detect light of such long wavelength. It is of interest to further note that the light of a tungsten filament lamp is in the infra-red region of wavelengths so that the device is particularly suited for detecting such light. When used for that purpose the device 19 embodied in the circuit of Figure 6 may be of a character and calibrated to afford a visual reading of detected light. Further the change in saturation current is proportional to light intensity over a wide range which makes the device suitable for quantitative measurements. The device further responds rapidly to changes of illumination, the response being instantaneous to a small fraction of a second with the effect having been achieved in less than $10^{-3}$ sec.

One sample of a germanium crystal identified as sample 25T was produced as follows:

Pure germanium dioxide, obtained from the Eagle-Picher Co. of Joplin, Missouri, was reduced by hydrogen in an electrically heated furnace. The resultant powder of reduced germanium was then melted in a porcelain crucible held in a graphite heater for about three minutes in an evacuated furnace. The melt was then solidified in vacuum.

This sample was used as the semi-conductor 3 of the device of Figure 1 and a point selected on the surface thereof exhibited the characteristics shown in Figures 2 and 3 under the conditions light and heat above described.

Figure 4:
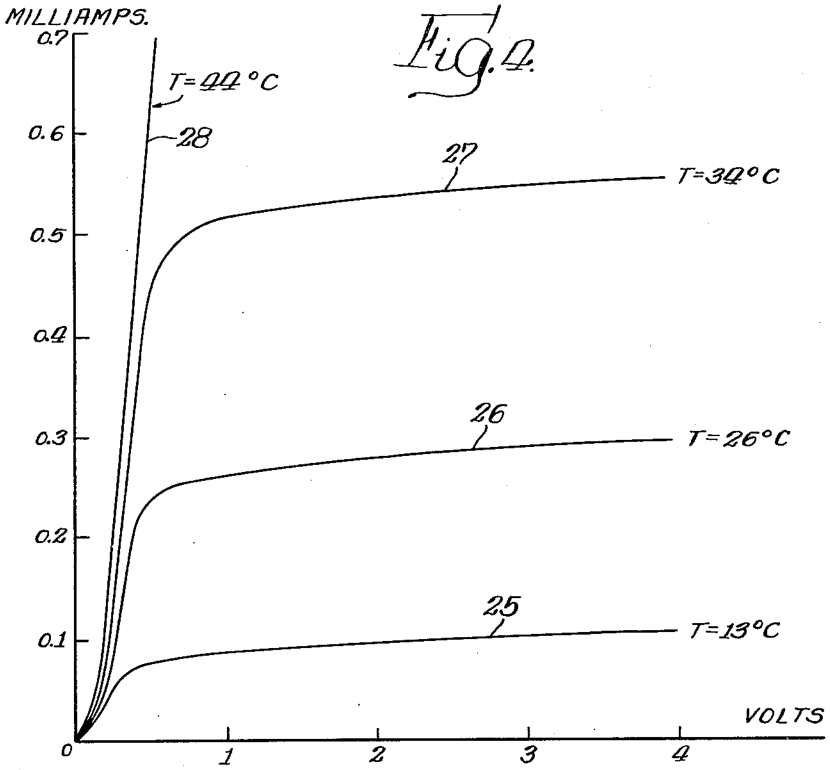
Figure 4 is a graph illustrating the effect of temperature on the current-voltage characteristics in the low resistance direction of current flow through the device of Figure 1 and with the electrode or whisker thereof being positive and the semi-conductor negative.

Referring now to Figure 4, I have shown a number of curves 25, 26 and 27 showing current-voltage characteristics of a device of Figure 1 with the above noted sample 25T serving as the semi-conductor 3 of the device. It will be observed that at a temperature of approximately 13° C. at the point of contact of the electrode with the selected region on the semi-conductor that the current-voltage characteristic illustrated by curve 25 prevails. The curve 26 is illustrative of the current-voltage characteristics with the temperature of the device at approximately 26° C., and the curve 27 is illustrative of the current-voltage characteristic at a temperature of 34° C. The curve 28 illustrates the characteristics with a temperature of about 44° C. In all the curves 25 through 28 the device was maintained in the dark. As a general observation which may be drawn from the several curves 25 to 27 of Figure 4 a change of approximately 9° C. is sufficient to cause a change in the saturation current by a factor of 2. The device of Figure 1 therefore may be embodied in the circuit of Figure 6 with the light shielded or being maintained substantially constant and with the heat being varied to effect actuation of the device 19, which in this instance may be calibrated to serve as a temperature indicating device.

It will be understood that the variation of saturation current with temperature extends over a wide temperature range, from greater than +100° C. to below −70° C. The curves of Figure 4 are to illustrate the variation in the vicinity of room temperature.

When a whisker is placed in contact with a suitable germanium alloy and the current saturation effect herein described is noted, it is found that a region exists on the surface of the semi-conductor and that placing the whisker at any point within the region results in the effect. This region corresponds to that enclosed by the barrier 11 in Figure 5. Furthermore, it is found that illumination falling at any point within this region is effective in producing a change in the saturation current, even if this point is a considerable distance from the whisker contact.

In the germanium crystals of my invention I have found that the sensitive regions may be of an area of from 0.1 mm.$^2$ to 10 mm.$^2$, and that the specific sample 25T above referred to had a sensitive area of approximately 4 mm.$^2$ which is sufficiently large to readily facilitate the finding of points thereon sensitive to light and heat as illustrated by the graphs of Figures 2, 3 and 4. It is desirable in constructing the semi-conductor 3 from suitable alloys of germanium to etch the surface of the alloy which is effective to facilitate the finding of the sensitive regions. Thus, if the surface of the crystal is first roughened (by grinding with 600 mesh Carborundum in water, for example) and then etched electrolytically, the barrier 11 serves to partially insulate the sensitive region 12 thus causing the sensitive region to be etched less than the surrounding area whereby the critical sensitive region can be readily observed visually. The etching of the alloys also has the further effect of making the saturation characteristics more pronounced. One suitable etching procedure for this purpose comprises a one minute treatment using the germanium crystal as an anode and a platinum foil as a cathode in a bath consisting of 10% $HNO_3$ with 5 volts being applied externally.

The magnitude of the saturation current (at 25° C. in the dark, for example) varies from one sensitive region to another, the current in general being larger for regions of larger area. Devices have been constructed in accordance with my invention with saturation currents ranging from 2 microamperes to 2 milliamperes.

When excessive voltage is applied to the contact, the current rises to values much greater than the saturation current at low voltage. The limiting voltage which can be applied varies from one unit to another. In general, 10 volts is not excessive and in some cases as high as 50 volts or more may be used. In the case of relatively poor units, however, it may be necessary to stay below 5 volts.

Also, the sensitivity to light varies for different specimens. As can readily be seen by reference to Figure 5, the thickness of the film 12 of N-type germanium will have an effect on the sensitivity, since this film will absorb light and only the light which reaches the barrier 11 can be effective. The sensitivity to light may thus vary from a small value to as high as over 20 milliamperes per lumen of white Mazda light. The latter value of sensitivity assumes that all the light is concentrated on the sensitive region.

The device of Figure 1 may also be constructed to form a photovoltaic device so that it is adapted to generate an electric current in an external circuit without the need of an external supply voltage. When the device of Figure 1 is utilized for this purpose I have found that it is desirable to provide a substantially large area of contact between the whisker or electrode 5 with the sensitive region of the semi-conductor 3 as, for example, an area of a contact of $10^{-4}$ cm.$^2$ or greater. When the device is thus constructed and connected in a low resistance external circuit as shown, for example, in Figure 7 and comprising the device 2′ connected by a lead 29 to a current responsive mechanism 30 which has a resistance 31 in series with it, connected by a lead 32 to the other terminal of the device, illumination of the contact of the whisker with the critical or sensitive region of the semi-conductor causes an external current to flow which is proportional to the intensity of illumination as illustrated by the graph of Figure 8.

In Figure 8, the curves 33, 34, 35 represent at different values of the series resistance 31 photocurrent versus light intensity for evenly distributed light. Since the device here used had a sensitive region of only 0.01 square centimeter, the sensitivity for light focussed entirely on the sensitive region would be about 5 milliamperes per lumen into a circuit of 50 ohms resistance. From the curves of Figure 8 it may be deduced that the interval resistance of the specimen of the device used is about 500 ohms. It is to be understood that not all units so constructed have these values of sensitivity and interval resistance, although these values are representative of good units. The effect occurs most strongly for light in the near infra-red region of wave lengths and this manner is similar to the photoelectric effect previously described.

Also the following observations have been made in connection with my present invention. Upon increasing of the load of the whisker with the semi-conductor as for example from a 1 gram load to a 1,000 gram load the back resistance characteristic as shown in Figure 2 is considerably reduced while the forward saturation current is practically unaffected. The implication of this observation is that the current limiting effect takes place not at the contact but at some barrier which surrounds it while the back resistance is due to a barrier at the contact. At large load the saturation current is reached at lower voltages due to the reduction of the forward resistance of the contact itself. It is believed therefore that the presence of the barrier 11, as shown in Figure 5, causes the saturation effect in the current-voltage characteristic, due to the fact that only a limited number of electrons have sufficient energy to get over the barrier. However, under illumination or increased temperature more electrons are activated and the saturation value of the current is increased. This theory of the effect of the barrier holds true for the current-voltage characteristics illustrated by the curves of Figures 3 and 4.

Now considering the device when it is incorporated in a circuit having no external applied voltage it is thought that light reaching the barrier causes a voltage to appear across the barrier which produces a current if the device is connected in an external circuit as shown, for example, in Figure 7. However, as previously observed, when the device is used in this manner it is desirable to make the whisker contact of large area preferably by pressing it against the germanium with considerable force in order to decrease the contact resistance and obtain maximum current flow.

It will be seen from the diagram in Figure 5, which shows an "island" of N-type germanium surrounded by P-type material, that it is possible to have an island of P-type material surrounded by N-type material, wherein exactly the same type of barrier is formed between these two materials. In such a case, the polarity of the voltage applied to the device must simply be reversed in order to observe the saturation effect, which will now occur when the semi-conductor is positive and the whisker negative. This reversed type of saturation actually occurs, but less frequently than the other. Clearly, the device herein described may be constructed in exactly the same manner for these reversed cases.

It is also to be undrestood that not all the devices herein described show as marked a saturation effect as is shown in Figure 1. In some cases, the current rises more rapidly as the voltage is increased, possibly due to a slight short-circuiting of the barrier 11. In these cases, the device still has the properties set forth herein, although the sensitivity is bound to be less due to the presence of the short-circuiting current.

As previously related the above expostulated barrier theory in which the barrier extends between P-type and N-type regions in the semi-conductor appears to afford a basis for the explanation of the current-voltage characteristics obtained with the device, but it will be understood that while the theory set forth is believed to be correct the manner in which the device shown in Figure 1 functions may be due to reasons other than those stated.

I claim:

1. An electrical device comprising a semi-conductor consisting of a body of substantially pure germanium having an impurity or impurities added therein and having N-type and P-type regions or areas of rectification therein, and a metallic conductor of good electrical conductivity in contact with a sensitive N-type region on the surface of said semi-conductor selected with respect to said N-type and P-type regions to provide the characteristic that over a predetermined range of applied voltage a substantially uniform saturation current flows between said semi-conductor and said conductor, and which saturation current is reversibly variable in response to changes in the amount of light applied to the sensitive region of the device.

2. An electrical device comprising a semi-conductor consisting of a body of an alloy of substantially pure germanium having an impurity or impurities added therein of a character to provide a sensitive region including an N-type region or area of rectification at the surface thereof substantially enclosed within an area or region of P-type rectification, and a metallic conductor of good electrical conductivity in contact with the surface of said semi-conductor within the perimeter of said N-type area or region selected to provide the characteristic that over a predetermined range of applied voltage a substantially uniform saturation current flows between said semi-conductor and said conductor, and which saturation current is reversibly variable in response to changes in the amount of light applied to the sensitive region of the device.

3. An electrical device comprising a semi-conductor consisting of a body of an alloy of substantially pure germanium having an impurity or impurities added therein of a character to provide a sensitive region including an N-type area or region of rectification at the surface thereof substantially enclosed within an area or region of P-type rectification, and a metallic conductor of good electrical conductivity in contact with the surface of said N-type region selected to provide when said semi-conductor is negative and said conductor is positive the characteristic that over a predetermined range of applied voltage a substantially uniform saturation current flows between said semi-conductor and said conductor, and which saturation current is reversibly variable in response to changes in the amount of light applied to the sensitive region of the device.

4. An electrical device comprising a semi-conductor consisting of a body of an alloy of substantially pure germanium of high resistivity having an impurity or impurities added therein of a character to provide a sensitive region including an N-type area or region of rectification at the surface thereof substantially enclosed within an area or region of P-type rectification, and a metallic conductor of good electrical conductivity in contact with the surface of said N-type region selected to provide when said semi-conductor is negative and said conductor is positive the characteristic that the current-voltage curve shows a saturation effect characterized by a saturation current of the order of 0.003 to 2 milliamperes in a voltage range of about 0.5 to 5 volts with said sensitive region at a temperature of about 25° C. and in the dark, and said saturation current being variable by illumination of said sensitive region, the change in said characteristic saturation current by substantially white light applied to said sensitive region lying in the range of about 0.1 to 20 milliamperes per lumen.

5. An electrical device comprising a semi-conductor consisting of a body of an alloy of substantially pure germanium having an impurity or impurities added therein of a character to provide a sensitive region including an N-type area or region of rectification at the surface thereof substantially enclosed within an area or region of P-type rectification, and a metallic conductor of good electrical conductivity in contact the surface of said N-type region selected to provide the characteristic that current flow is enhanced through said device upon projecting light on the sensitive region of the device.

6. An electrical device comprising a semi-conductor consisting of a body of an alloy of substantially pure germanium having an impurity or impurities added therein of a character to provide a sensitive region including an N-type area or region of rectification at the surface thereof substantially enclosed within an area or region of P-type rectification, and a metallic conductor of good electrical conductivity in contact with the surface of said N-type region selected to provide the characteristic of generation of current flow through said device of the order of 0.1 to several milliamperes upon the projection of light of 1 lumen upon the sensitive region of the device and with the temperature of the latter maintained substantially constant at 25° C.

7. The device of claim 2 characterized by said semi-conductor consisting of germanium and a member selected from the group consisting of tin, strontium, barium, bismuth, lead, titanium, and nitrogen.

8. The device of claim 2 characterized by said semi-conductor consisting of germanium and a member selected from the group consisting of tin, strontium, barium, bismuth, lead and titanium in an amount of the order of 0.2 atomic percent, and said group including nitrogen impregnated in the germanium.

9. The device of claim 5 characterized by said semi-conductor consisting of germanium and a member selected from the group consisting of tin, strontium, barium, bismuth, lead, titanium, and nitrogen.

10. The device of claim 5 characterized by said semi-conductor consisting of germanium and a member selected from the group consisting of tin, strontium, barium, bismuth, lead and titanium in an amount of the order of 0.2 atomic percent, and said group including nitrogen impregnated in the germanium.

SEYMOUR BENZER.

REFERENCES CITED

The following references are of record in the file of this patent:

UNITED STATES PATENTS

| Number | Name | Date |
|---|---|---|
| 1,739,256 | Pender et al. | Dec. 10, 1929 |

OTHER REFERENCES

Merritt's "Germanium," Proceedings Nat. Academy of Science, volume 11, 1925, pages 743–748.

Bidwell's "Germanium" in the "Physical Review," volume XIX, No. 5, May 1922, second series, pages 447–455.